United States Patent [19]
Aupic et al.

[11] Patent Number: 4,946,525
[45] Date of Patent: Aug. 7, 1990

[54] PROCESS FOR THE BUTTED CONNECTING OF THE EDGES OF A RUBBERIZED FABRIC INTENDED FOR THE MANUFACTURE OF A CARCASS REINFORCEMENT, AND THE TIRE WITH RADIAL CARCASS REINFORCEMENT OBTAINED THEREBY

[75] Inventors: Bernard Aupic; Jean-Claude Tardivat, both of Clermont-Ferrand, France

[73] Assignee: Compagnie Generale des Etablissements Michelin - Michelin & CIE, Clermont-Ferrand, France

[21] Appl. No.: 278,827

[22] Filed: Dec. 2, 1988

[30] Foreign Application Priority Data

Dec. 3, 1987 [FR] France ................................ 87 16946

[51] Int. Cl.$^5$ ................................................ B60C 9/00
[52] U.S. Cl. ...................................... 156/134; 152/548; 156/157; 156/304.3
[58] Field of Search ................... 156/134, 157, 244.22, 156/304.1, 304.3; 152/548; 428/57, 58

[56] References Cited

U.S. PATENT DOCUMENTS

| | | | |
|---|---|---|---|
| 3,282,759 | 11/1966 | Nemeth | 156/157 |
| 3,895,990 | 7/1975 | Josteit | 156/304.3 |
| 3,933,565 | 1/1976 | Printz et al. | 156/304.1 |
| 4,054,475 | 10/1977 | Botasso et al. | 156/157 |
| 4,768,575 | 9/1988 | Bruner et al. | 156/134 X |

FOREIGN PATENT DOCUMENTS

| | | | |
|---|---|---|---|
| 0939719 | 3/1956 | Fed. Rep. of Germany | 156/304.3 |
| 2504181 | 8/1976 | Fed. Rep. of Germany | 156/157 |
| 2152742 | 4/1973 | France | . |
| 2207010 | 6/1974 | France | . |

*Primary Examiner*—Raymond Hoch
*Attorney, Agent, or Firm*—Brumbaugh, Graves, Donohue & Raymond

[57] ABSTRACT

The process for the butt connecting of the edges of a rubberized fabric which is formed of reinforcement elements which are parallel to each other and spaced apart by a pitch p by injecting under pressure and heat between the reinforcement elements of the edges spaced apart by an amount d greater than 1.5 p, a rubber mix having properties of coherence and stretching in raw state which are greater than the same properties of the coating mix of the reinforcement elements. In the tire produced from such a fabric, the welding mix has a modulus of elasticity in tension which is greater than said modulus of the coating mix of the reinforcement elements of the radial carcass reinforcement.

2 Claims, 1 Drawing Sheet

PROCESS FOR THE BUTTED CONNECTING OF THE EDGES OF A RUBBERIZED FABRIC INTENDED FOR THE MANUFACTURE OF A CARCASS REINFORCEMENT, AND THE TIRE WITH RADIAL CARCASS REINFORCEMENT OBTAINED THEREBY

BACKGROUND OF THE INVENTION

The present invention concerns a process intended to connect the edges of rubberized reinforcement fabrics of plies. These fabrics or plies are currently used in the tire industry, where they form the basis for the manufacture of reinforcements and, in particular, the carcass reinforcement of a radial tire.

These fabrics are generally obtained by coating or calendering a series of reinforcement elements which are parallel to each other, such as cords or cables, by means of layers of mixes of unvulcanized rubber. As is known, a mix comprises the elastomer, the reinforcing fillers, the vulcanizing agents and all the additives necessary to impart the required properties to it both in unvulcanized state and in vulcanized state.

For the manufacture of a carcass reinforcement, particularly a carcass reinforcement having radial reinforcement elements, these fabrics are cut into the shape of rectangles perpendicular to the reinforcement elements. These fabric rectangles must then be assembled to each other by means of a joint or weld which makes it possible to connect the two edges of the fabric parallel to the reinforcement elements.

Two types of joint are currently used, either upon the preparation of the roll of fabric or upon the building-up of the carcass reinforcement on a cylindrical core —the so-called overlap joint and the so-called butt joint.

As its name indicates, the technique of the overlap joint consists in covering one edge of the ply by the other edge over a certain distance and assuring the attachment by the application of pressure. This type of weld is generally used more particularly when the fabric is reinforced by textile cords or cables, and it is of great strength due to the large surface of adherence between the overlapping parts. As it has a double thickness of fabric over a certain circumferential distance, this overlap weld is not without drawbacks. In the case of a carcass reinforcement, the number of reinforcement elements is multiplied by two on the meridian part which is occupied by the joint; under the effect of the inflation pressure, the elongation of the reinforcement elements of the joint is two times less than elongation of all the other reinforcement elements of the reinforcement. From this there results a lack of uniformity of the walls of the resultant tire, and more particularly of the side walls of the tire in the case of a tire with radial carcass reinforcement and tread reinforcement. This lack of uniformity is very harmful to the external appearance of the tire as well as to the uniformity of travel.

The butt welding of the edges of a ply eliminates said drawbacks but gives rise to other drawbacks which are no less important. This attachment is based exclusively on the mere adhesivity of two very small portions of unvulcanized mix which is the coating mix of the reinforcement elements and, despite the costly precautions taken to produce this joint, it is less strong and frequently gives rise to definite weaknesses upon the transformation of the cylindrical blank of the reinforcement into a toroidal blank. Not only is the difference between the two cables of the edges of the fabric random at the level of the weld but breaks occur in the bridge of rubber between the two cables, particularly in the zones of greater circumferential development.

Such irregularities, despite the rejection of non-complying raw blanks, lead to weaknesses in the carcass reinforcement with respect to the fatigue strength upon travel, particularly at the level of the upper part of the side walls.

A number of solutions have been proposed in order to improve both overlap welds and butt welds. U.S. Pat. No. 4,466,473 describes a method of manufacturing a radial carcass reinforcement which consists in providing one of the edges of the used fabric with slits perpendicular to the direction of the reinforcement cords or cables, this edge being then covered by the other edge to form the joint by overlap. Such a process thus makes it possible to produce a tire which does not have irregularities on the side walls.

French Pat. No. 2,389,483 concerns a method of manufacturing a carcass reinforcement in which the two edges of the fabric are butted together on the cylindrical building drum. The improvement in the strength of this weld is obtained by covering it with a strip of cords of low tensile strength and of a low modulus of elasticity which are coated in a rubber mix, these cords being oriented perpendicular to the reinforcement elements of the fabric used for the building of the reinforcement. Such a process has the drawback of introducing into the carcass reinforcement an additional rubberized fabric of costly manufacture.

The purpose of the present invention is to produce a strong butt connection between the edges of a fabric at minimum cost and which provides on the vulcanized finished tire a suitable external appearance of the side walls while permitting excellent resistance to fatigue of the carcass reinforcement.

The process for the butt connection, parallel to the reinforcement elements, of the edges of a fabric intended for the manufacture of a radial carcass reinforcement and formed of cords or cables included in a rubber mix, these cords or cables being parallel to each other and spaced apart by a pitch p, is characterized by the fact that the fabric is placed on a support such that the distance d between the two cords or cables of the edges of the fabric is between 1.5 p and 1.5 $\tau$p, $\tau$ being the smallest shaping ratio of the radial carcass reinforcement which can be produced from said fabric, and by the fact that into the space thus created there is injected, under a pressure of at least 5 bars, an unvulcanized rubber mix which has been brought to a temperature of at least 70° C. and has a Mooney viscosity $V_2$, at least equal to 1.2 times the Mooney viscosity $V_1$ of the coating mix for reinforcement elements of the fabric and a modulus of elasticity $m_2$ at least equal to 1.5 times the modulus of elasticity $m_1$ of the coating mix.

The distance d between the two cords or cables of the edges is measured between the axes of symmetry of the two reinforcement elements. The same is true of the distance p.

The mix applied between the two edges of the fabric to be connected has a coherence in raw state which is far greater than that of the coating mix for the cords or cables of the fabric. This coherence in raw state is measured, on the one hand, by the Mooney viscosity in accordance with the standardized ASTM Method D1646 and, on the other hand, by the modulus of elasticity in unvulcanized state at a temperature, referred to as ambient temperature, of 23° C., and for a relative elongation of 500%. As known, the modulus of elasticity is obtained from the curve of the traction force F imposed on a test specimen of cross section $S_o$ as a function of the relative elongation $\gamma$. The modulus is then equal to $F/S_o.1/\gamma$.

It is also known that the shaping ratio of a radial carcass reinforcement at a given point of its meridian profile is equal to the ratio of the radius R of the point in question of the said profile of the shaped and vulcanized tire to the radius $R_o$ of the same point on the unshaped profile, R and $R_o$ being measured with respect to the axis of rotation of the tire. In the present case, the shaping ratio $\tau$ corresponds to the point of intersection of the meridian profile of the carcass reinforcement with the equatorial plane, that is to say the point of maximum radius R of the carcass reinforcement in the vulcanization mold of the tire.

A fabric formed of coated cords or cables can be used for the manufacture of a single carcass reinforcement. The distance d is then selected in such a manner as to be between 1.5 p and 1.5 $\tau$p, $\tau$ being the shaping ratio of the carcass reinforcement which can be produced from the said fabric of pitch p.

The carcass reinforcements can be produced from the fabric of pitch p, thus to reinforce several tires which can be distinguished by their dimensions (height on rim, maximum axial width, ratio of height to width) and/or by their type (HR, SR, VR) and/or by the external configuration of their tread.

Whatever the tire, its carcass reinforcement has, at the level of the bead wires, a distance between cables which is not constant circumferentially. At the level of a weld, this distance d is at least equal to 1.5 times the distance between the other cables. In order to minimize the effects of this difference in distance between cables on the fatigue strength of the carcass reinforcement, it is advantageous that the weld mix have in vulcanized state a modulus of elasticity which is greater than the modulus of elasticity of the coating mix.

Accordingly, the present invention also concerns a tire having two sidewalls which are connected by a tread, a tread reinforcement and a carcass reinforcement anchored to at least one bead ring in each bead and formed of at least one ply of cords or cables which form an angle of 90+10° to the circumferential direction, each ply having one or more butt welds parallel to the reinforcement elements, characterized by the fact that the two cords or cables between which a weld is effected are spaced apart by a distance d, measured at the level of the bead wires, which is at least equal to 1.5 times the distance p between the other cords or cables, and by the fact that the rubber mix inserted between the two weld cords or cables has a modulus of elasticity $M_2$ which is greater than the modulus of elasticity $M_1$ of the coating mix of the cords or cables.

The modulus of elasticity in vulcanized state has the same definition as the modulus in non-vulcanized state. It is measured for a relative elongation of 25%. Preferably the weld mix, which has a chemical composition different from the coating mix, has a modulus of elasticity $M_2$ at least equal to 1.2 times the modulus $M_1$ of the coating mix.

The invention will be described in detail with reference to the accompanying drawing, which is given merely by way of illustration and not of limitation and in which.

Figure 1:
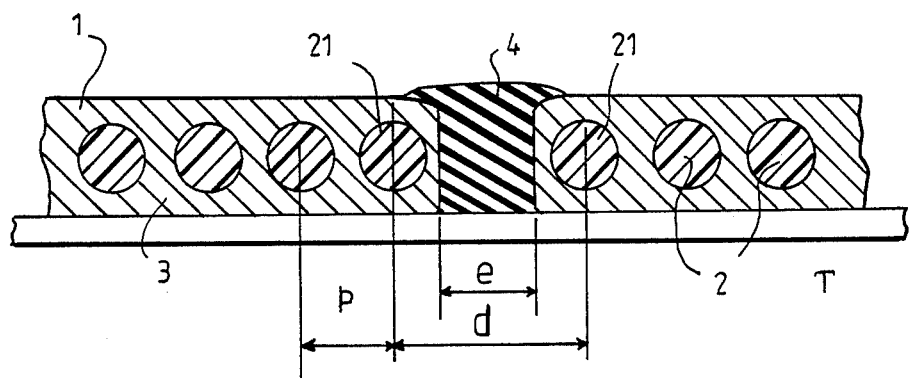
FIG. 1 is a sectional view, perpendicular to the reinforcement elements of the fabric, of two edges of rubberized fabric which are butt connected in accordance with the invention.

The rubberized fabric 1 is formed of reinforcement elements 2 which are 184/2 rayon cables (2 strands of 184 tex), with a number of 126 cables per decimeter measured perpendicular to the cables. The pitch between two cables is then equal to 0.79 mm. These cables are coated in a mix 3, the elastomer of which is natural rubber, the Mooney viscosity of which is equal to 60 and the modulus of elasticity of which in raw state for a relative elongation of 500% is equal to 0.08 MPa.

The fabric 1 is placed on a work table T in such a manner that the end reinforcement elements 21 of the two fabric edges intended to be connected together are parallel to each other and spaced apart by the distance d which is substantially equal to 1.60 mm, which corresponds to a value close to 2 p. The rubber mix 4, the Mooney viscosity of which is equal to 90 and the modulus of elasticity of which for the same relative elongation is equal to 0.19 MPa, is injected into the space e under a pressure of 7 bars, at a temperature of 80° C.

The injection is effected, as known, by means of an injection syringe or a microextruder mounted on a support which permits displacement along the space e. This support also comprises a pressing cylinder or roller intended, as its name indicates, to perfect the uniformity of the weld by rolling under pressure.

It is understood that the connecting of the two edges can be effected on a cylindrical core intended to shape a radial carcass reinforcement and around which there has been previously placed a layer of rubber mix intended to form the inner layer of the tire.

Figure 2:
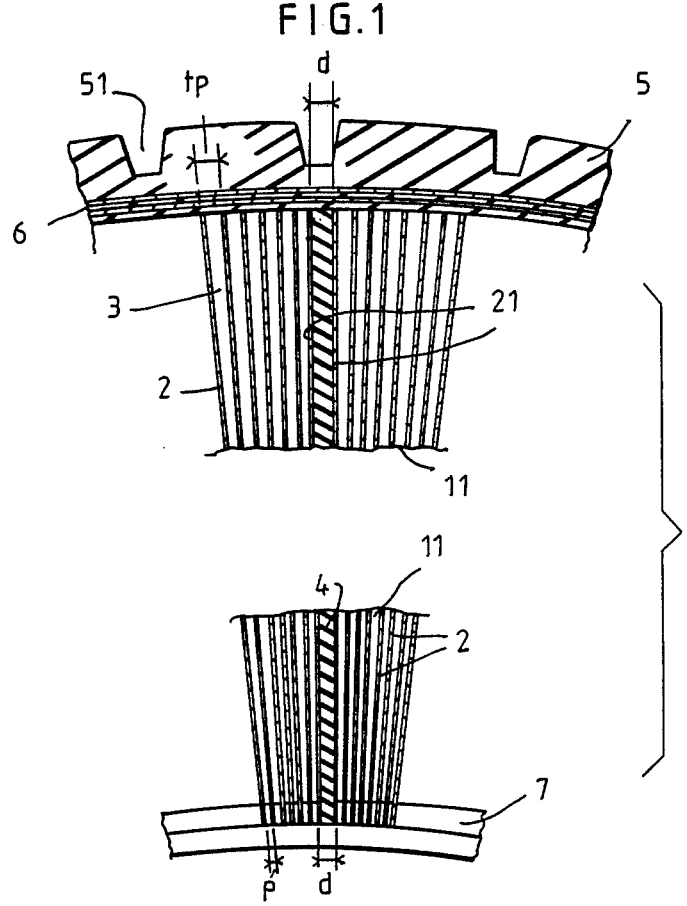
FIG. 2 is a longitudinal section through a molded tire having a carcass reinforcement obtained by the process of the invention.

The 155-13 MX tire shown in FIG. 2 comprises a tread 5 provided with grooves 51, a tread reinforcement 6 formed of two plies of metal cables crossed from one ply to the next and forming an angle of less than 25° with the circumferential direction, a bead ring 7 in each bead, and a radial carcass reinforcement 11 formed of a single fabric ply 1.

At the level of the bead wires 7, the cables 2 of the fabric 1 are spaced from each other by an amount p which is substantially equal to 0.79 mm, while the weld cables 21 are spaced apart by an amount d which is substantially equal to 1.60 mm. The shaping ratio of the carcass reinforcement 11 used being 1.71, the distance between two normal cables 2 measured at the level of the equatorial plane is then equal to $1.71 \times 0.79 = 1.35$ mm and the distance d between two weld cables 21 remains practically constant and substantially equal to 1.60 mm in view of the properties in raw state of the weld mix 4 used as compared with the properties of the coating mix 3. The modulus of elasticity, under vulcanized state, of the weld mix 4 is equal to 8.2 MPa and that of the mix 3 is equal 2.4 MPa.

We claim:

1. A process for butting two edges of a reinforced ply (1) for a radial carcass, the reinforced ply being formed of parallel elongated reinforcement elements (2) embedded in a rubber mix (3) in which the reinforcement elements are spaced apart by a pitch p, the ply having an end elongated reinforcement element (21) near each edge to be butted, characterized by the fact that the ply (1) is placed on a support with the edges to be butted spaced apart such that the end reinforcement elements (21) are parallel to each other and spaced apart by a distance (d) which is between 1.5 p and 1.5 τp, τ being the smallest shaping ratio of the radial carcass reinforcement (11) which can be made from said ply (1), and by the fact that an unvulcanized rubber mix (4), brought to a temperature of at least 70° C. and having a Mooney viscosity ($V_2$) at least equal to 1.2 times the Mooney viscosity ($V_1$) of the rubber mix (3) of the ply (1) and a modulus of elasticity $m_2$ at least equal to 1.5 times the modulus of elasticity $m_1$ of the rubber mix (3) of the ply (1), is injected under a pressure of at least 5 bars into a space (e) located between the spaced apart edges.

2. A tire having two sidewalls connected by a tread (5), a tread reinforcement (6) and a carcass reinforcement (11) anchored to at least one bead ring (7) in each bead and formed of at least one ply of elongated reinforcement elements (2) forming an angle of 90°±10° with the tire circumferential direction, each ply having at least one butt weld arranged parallel to the reinforcement elements (2), characterized by the fact that a splice is effected between two of the reinforcement elements (21) spaced apart by a distance (d), as measured at a tire height which is at the same level as the bead wires (7), which distance is at least equal to 1.5 times the distance (p) between other reinforcement elements (2), and by the fact that a rubber mix (4) is inserted between the two reinforcement elements (21) between which the splice is effected, the rubber mix (4) having a modulus of elasticity $M_2$ at least equal to 1.2 times the modulus of elasticity $M_1$ of the coating rubber mix (3) of reinforcement elements (2).

* * * * *

UNITED STATES PATENT AND TRADEMARK OFFICE
CERTIFICATE OF CORRECTION

PATENT NO. : 4,946,525

DATED : Aug. 7, 1990

INVENTOR(S) : Aupic et al.

It is certified that error appears in the above-identified patent and that said Letters Patent is hereby corrected as shown below:

Col. 3, line 6, "elongation $\gamma$" should read --elongation $\varepsilon$--;

line 7, "$F/S_o.1/\gamma$" should read --$F/S_o.1/\varepsilon$--;

line 23, "$\tau p, \tau$" should read --$\tau_1 p, \tau_1$--;

line 47, "90 + 10°" should read --90 $\pm$ 10°--.

Col. 4, line 59, "equal" should read --equal to--.

Signed and Sealed this

Twenty-fourth Day of December, 1991

Attest:

HARRY F. MANBECK, JR.

*Attesting Officer*     *Commissioner of Patents and Trademarks*